(12) United States Patent
Miyachi et al.

(10) Patent No.: US 7,307,682 B2
(45) Date of Patent: Dec. 11, 2007

(54) DISPLAY ELEMENT AND DISPLAY DEVICE

(75) Inventors: Koichi Miyachi, Soraku-gun (JP); Iichiro Inoue, Tenri (JP); Seiji Shibahara, Tenri (JP); Shoichi Ishihara, Katano (JP)

(73) Assignee: Sharp Kabushiki Kaisha, Osaka (JP)

( * ) Notice: Subject to any disclaimer, the term of this patent is extended or adjusted under 35 U.S.C. 154(b) by 492 days.

(21) Appl. No.: 11/035,404

(22) Filed: Jan. 14, 2005

(65) Prior Publication Data

US 2005/0185125 A1     Aug. 25, 2005

(30) Foreign Application Priority Data

Jan. 15, 2004 (JP) ............................. 2004-008459
Jan. 13, 2005 (JP) ............................. 2005-006867

(51) Int. Cl.
*G02F 1/1337* (2006.01)
*G02F 1/1335* (2006.01)

(52) U.S. Cl. .................... 349/128; 349/123; 349/96

(58) Field of Classification Search ............. 349/128, 349/123, 96
See application file for complete search history.

(56) References Cited

U.S. PATENT DOCUMENTS

| | | | |
|---|---|---|---|
| 4,035,060 A * | 7/1977 | Tsunoda et al. | 349/152 |
| 5,701,168 A | 12/1997 | Patel | |
| 5,853,822 A | 12/1998 | Lyu | |
| 5,888,421 A | 3/1999 | Toyne et al. | |
| 6,005,038 A * | 12/1999 | Yu et al. | 524/380 |
| 6,266,109 B1 | 7/2001 | Yamaguchi et al. | |
| 6,400,489 B1 | 6/2002 | Suzuki et al. | |
| 6,950,584 B1 | 9/2005 | Suzuki | |

FOREIGN PATENT DOCUMENTS

| | | |
|---|---|---|
| JP | 9-90434 A | 4/1997 |
| JP | 2000-122066 A | 4/2000 |
| JP | 2001-249363 A | 9/2001 |

(Continued)

OTHER PUBLICATIONS

Saito et al, "Thermodynamics of a Unique Thermo-Tropic Liquid Crystal Having Optical Isotropy", Ekisho, Vo. 5, No. 1, 2001, pp. 20-27 w/partial English Translation.

(Continued)

*Primary Examiner*—Mike Qi
(74) *Attorney, Agent, or Firm*—Nixon & Vanderhye, P.C.

(57) ABSTRACT

On one of surfaces of each substrate, an electrode is provided. Then, alignment films, which have been subjected to rubbing treatment, are provided on the respective electrodes so that the alignment films covers the respective electrodes. Moreover, on the other one of the surfaces of each substrate, a polarizer is provided so that its absorption axial direction matches with a rubbing direction of the corresponding alignment film. The substrates face each other so that the rubbing directions of the alignment films respectively provided on the substrates cross each other perpendicularly. A medium having a negative type liquid crystalline property is sealed between the substrates so as to form a material layer. In this way, it is possible to improve contrast and to alleviate coloring phenomenon in a display element in which transmittance is changed by controlling orientational order of molecules.

15 Claims, 7 Drawing Sheets

FOREIGN PATENT DOCUMENTS

| | | |
|---|---|---|
| JP | 2003-75840 A | 3/2003 |
| JP | 2003-255347 A | 9/2003 |
| WO | 02/082174 A1 | 10/2002 |

OTHER PUBLICATIONS

Yamamoto, "Liquid Crystal Micro Emulsion", Ekisho, vol. 4, No. 3, 2000, pp. 248-254 (partial English Translation).

Shiraishi et al, "Kobunshi Ronbunshu", vol. 59, No. 12, Dec. 2002, pp. 753-759 (partial English Translation).

Yoneya, "Examining Nano-Structured Liquid Crystal Phase by Molecule Simulator", Ekisho, vol. 7, No. 3, 2003, pp. 238-245 (partial English Translation).

Yamamoto, "First Lecture of Liquid Crystal Science Experiment: Identification of Liquid Crystal Phase", Lyotropic Liquid Crystal, Ekisho, vol. 6, No. 1, 2002, pp. 72-83 (partial English Translation).

Demus et al, Handbook of Liquid Crystals, vol. 1: Fundamentals, 1998, pp. 484-485 & 530.

Demus et al, Handbook of Liquid Crystals, "Low Molecular Weight Liquid Crystal", WILEY-VCH, vol. 2B, 1998, pp. 887-900.

Grelet et al, "Structural Investigations on Smectic Blue Phases", Physical Review Letters, vol. 86, No. 17, pp. 3791-3794.

Matsumoto et al, Fine Droplets of Liquid Crystals in a Transparent Polymer and Their Response, Appl. Phys. Lett., 69, 1996, pp. 1044-1046.

Mizoshita et al, "Fast and High-Contrast Electro-Optical Switching of Liquid-Crystalline Physical Gels" Formation of Oriented Microphase-Separated Structures, Adv. Funct. Mater., vol. 13, No. 4, Apr. 2003, pp. 313-317.

Zhixin, "The Basis for Process of Liquid Crystal Devices" with partial English translations, Beijing University of Posts and Telecommunications Press, vol. 1, ISBN 7-5635-0450-8/TN-198, Dec. 31, 2000, pp. 76-77 and 92-94.

* cited by examiner

DISPLAY ELEMENT AND DISPLAY DEVICE

This Nonprovisional application claims priority under 35 U.S.C. § 119(a) on Patent Applications Nos. 2004/008459 and 2005/006867 filed in Japan respectively on Jan. 15, 2004 and on Jan. 13, 2005, the entire contents of which are hereby incorporated by reference.

FIELD OF THE INVENTION

The present invention relates to a display element and display device having such excellent display properties, such as high-speed response and a wide-view.

BACKGROUND OF THE INVENTION

Liquid crystal display elements are advantaged over other display elements in terms of its thin thickness, light weight, and low power consumption. The liquid crystal display elements are widely used in image display apparatuses such as televisions, video cassette recorders, and the like, and OA (Office Automation) apparatuses such as monitors, word processors, personal computers, and the like.

Conventionally known liquid crystal display methods of the liquid crystal display elements are, for example, the TN (Twisted Nematic) mode in which a nematic liquid crystal is used, display modes in which FLC (Ferroelectric Liquid crystal) or AFLC (Antiferroelectric Liquid crystal) is used, a polymer dispersion type liquid crystal display mode, and the like mode.

Among the liquid crystal display methods, for example, the TN (Twisted Nematic) mode in which the nematic liquid crystal is used is conventionally adopted in the liquid crystal display elements in practical use. The liquid crystal display elements using the TN mode have disadvantages of slow response, narrow viewing angle, and the like drawbacks. Those disadvantages are large hindrances for the TN mode to take over CRT (Cathode Ray Tube).

Moreover, the display modes in which the FLC or AFLC is used, are advantageous in their fast response and wide viewing angles, but significantly poor in anti-shock property and temperature characteristics. Therefore, the display modes in which the FLC or AFLC is used, have not been widely used practically.

Further, the polymer dispersion type liquid crystal display mode, which utilizes scattering of light, does not need polarizer and is capable of performing highly bright display. However, in principle, the polymer dispersion type liquid crystal display mode cannot control the viewing angle by using a phase plate (retardation film). Further, the polymer dispersion type liquid crystal display mode has a problem in terms of the response property. Thus, the polymer dispersion type liquid crystal display mode is not so advantageous over the TN mode.

In all those display methods, liquid crystal molecules are oriented in a certain direction and thus a displayed image looks differently depending on an angle between a line of vision and the liquid crystal molecules. On this account, all those display methods have viewing angle limits. Moreover, all the display methods utilize rotation of the liquid crystal molecules, the rotation caused by application of an electric field on the liquid crystal molecules. Because the liquid crystal molecules are rotated in alignment all together, responses take time in all the display method. The display modes in which the FLC and the AFLC are used, are advantageous in the response speed and the viewing angle, but have such a problem that their alignment would be irreversibly destroyed by an external force.

On contrary to those display methods in which the rotation of the molecules by the application of the electric field is utilized, a display method in which the secondary electro-optical effect is utilized.

The electro-optical effect is a phenomenon in which a refractive index of a material is changed by an external electric field. There are two types of the electro-optical effect: one is an effect proportional to the electric field and the other is proportional to the square of the electric field. The former is called the Pockels effect and the latter is called the Kerr effect. Especially the Kerr effect has been adopted in high-speed optical shutters early on, and has been practically used in a special measurement instruments. The Kerr effect was discovered by J. Kerr in 1875. So far, organic liquid such as nitrobenzene, carbon disulfide, and the like, are known as material showing the Kerr effect. Those materials are used, for example, in the aforementioned optical shutters, and the like devices. Further, those materials are used for measurement of strength of high electric fields for power cables and the like, and the like usage.

Later on, it was found that liquid crystal materials have a large Kerr constant. Researches on basic technology have been conducted to utilize the large Kerr constant of the liquid crystal materials for use in light modulation devices, light deflection devices, and further optical integrated circuit. It was reported that some liquid crystal compounds have a Kerr constant more than 200 times higher than that of nitrobenzene.

Under those circumstances, studies for utilization of the Kerr effect in display apparatuses has been started. It is expected that the utilization of the Kerr effect attains relatively a low voltage driving because the Kerr effect is proportional to the square of the electric field. Further, it is expected that the utilization of the Kerr effect attains a high-response display apparatus because the Kerr effect shows a response property of several µ seconds to several m seconds, as its basic nature.

Incidentally, one of large practical problems to be overcome for utilizing the Kerr effect in display elements is that the utilization of the Kerr effect requires a larger driving voltage compared with the conventional liquid crystal display elements. To solve this problem, Publication of Japanese Patent Application, publication No. 2001-249363 (Tokukai 2001-249363; published on Sep. 14, 2001) (hereinafter, referred to as Patent publication 1) teaches an art in which a display element in which orientation of negative type liquid crystalline molecules is carried out is provided with substrates having a surface that have been subjected to alignment treatment, in order that the Kerr effect may be easily generated in the display element.

In the display element described in Patent Document 1, the negative type liquid crystalline molecules are provided between a pair of substrates. Here, the wording "negative type" indicates that the liquid crystalline molecules shows negative dielectric anisotropy. Moreover, electrodes are provided respectively on inner sides of the substrates. Alignment films which have been treated with rubbing process are provided on the electrodes. Moreover, on outers sides of the substrates, polarizers are so provided that their absorption axes cross each other perpendicularly. Moreover, rubbing directions of the alignment films provided on the electrodes are parallel and directed in the same or opposite directions. Further, the rubbing directions make 45 degrees with the absorption axes of the polarizers.

In the display element of Patent Document 1 having the above arrangement, an electric field (voltage) is applied between the electrodes so as to generate the electric field along a normal direction of the substrates. When the electric field is applied, the polarized negative type liquid crystalline molecules are oriented along an electric field direction in such a manner that the molecules are so directed that their major axial directions is parallel to the rubbing direction (the electric field direction is a direction in which an electric field is applied). With this arrangement, the display element of Patent Document 1 attain optical response property in which its transmittance is increased by the electric field application.

The display element disclosed in the publication 1 has such a problem that when no electric field is applied, light leakage occurs thereby causing poor contrast, whereas when the electric field is applied, coloring phenomenon is caused.

SUMMARY OF THE INVENTION

The present invention is accomplished in view of the aforementioned problem. An object of the present invention is to provide a display element in which transmittance is changed by controlling orientational order of molecules, and in which contrast is improved and coloring phenomenon is alleviated, and a display device provided with the display element.

A display element according to the present invention is, in order to attain the object, provided with a pair of substrates, at least one of which is transparent; a material layer between the substrates; a material layer between the substrates; and alignment films respectively provided on facing surfaces of the substrates. The display element performing display operation by applying a field on the material layer. The material layer has a medium being changeable in a magnitude of its optical anisotropy by the field. The alignment films have alignment directions that cross each other perpendicularly.

The field (or force) in the above arrangement is not particularly limited, provided that it can change the magnitude of the optical anisotropy of the medium. For example, the field may be an electric field, magnetic field, light, or the like.

Here, when the magnitude of the optical anisotropy is changed, a shape of a refractive index ellipsoid is changed. That is, in the display element according to present invention, it is possible to change the display state by utilizing the change in the shape of the refractive index ellipsoid depending on whether the field is applied or not.

On the contrary, the display operation in the conventional liquid crystal display element is carried out by applying an electric field on a medium. In the conventional liquid crystal display element, the refractive index ellipsoid is kept ellipsoidal regardless of whether the electric field is applied or not. However, a major axial direction of the refractive index ellipsoid (direction of the refractive index ellipsoid) is changed (rotated) depending on whether the electric field is applied or not. That is, in the conventional liquid crystal display element, the display state is changed by utilizing the change (rotation) of the major axial direction of the refractive index ellipsoid (direction of the refractive index ellipsoid) depending on whether the field is applied or not.

In such a conventional liquid crystal display element in which the change in the orientational direction of the liquid crystal molecules is utilized, inherent viscosity of the liquid crystal largely affects response speed of the conventional liquid crystal display element. On the contrary, in the above arrangement, the display operation is carried out by utilizing the change in the magnitude of the optical anisotropy of the medium. Therefore, unlike the conventional liquid crystal display element, the above arrangement is free from such problem that the inherent viscosity of the liquid crystal largely affects response speed. Therefore, this arrangement attains high-speed (fast) response. Moreover, the high-speed response property allows the display element of the present invention to be used in, for example, a display device of field sequential color mode.

Moreover, according to this arrangement, phase differences caused in the vicinity of the alignment films by the alignment films, or phase differences caused by molecules adsorbed on the alignment films cross each other perpendicularly. Thus, the phase differences cancel out each other. Therefore, the phase differences make no contribution to the transmittance (transmissivity). Because of this, it is possible to attain high contrast.

Moreover, with this arrangement, it is possible to orient the molecules of the medium in one twisting direction when the field is applied or when no field is applied (that is, the molecules are directed in different directions sequentially from one substrate to the other). In this way, the twisted structure is formed. As a result, it becomes possible to suppress the coloring phenomenon caused by wavelength dispersion of the refractive index of the molecules.

Therefore, with this arrangement, it is possible to realize a display element in which transmittance is changed by controlling orientational order of molecules, and in which contrast is improved and coloring phenomenon is alleviated, and a display device provided with the display element.

As the field to change the magnitude of the optical anisotropy of the medium, the electric field is preferable for the sake of easy designing and driving control of the display element.

In order to attain the object, a display device according to the present invention is provided with the display element having this arrangement.

The display device thus arranged is provided with the display element in which transmittance is changed by controlling orientational order of molecules, and in which contrast is improved and coloring phenomenon is alleviated, and a display device provided with the display element. This display device is advantageous in that contrast is improved and the coloring phenomenon is alleviated.

The high-speed response property of the display element according to the present invention allows the display element to be used in a display device of field sequential color mode.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a schematic cross sectional view for explaining orientation of molecules in the display element according to the embodiment of the present invention when an electric field is applied.

DESCRIPTION OF THE EMBODIMENTS

Figure 2:
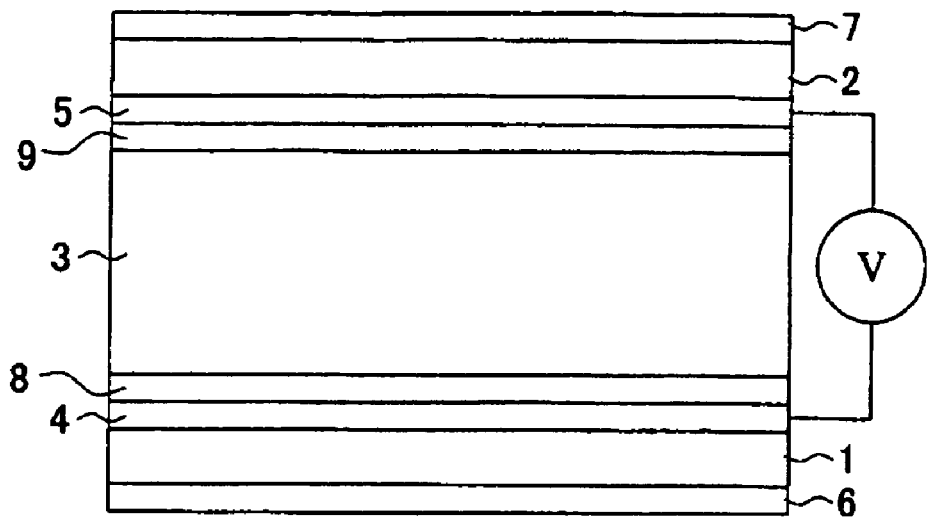
FIG. 2 is a cross sectional view schematically illustrating an arrangement of the display element according to the present invention.

An embodiment of the present invention is described below referring to drawings. FIG. 2 is a cross sectional view schematically illustrating an arrangement of a display element (present display element) according to the present embodiment. The present invention is not limited to the arrangement mainly discussed in the present embodiment. In the arrangement, display operation is carried out by using a medium that is optically isotropic in dependence upon application of an electric field (e.g., voltage), e.g., being isotropic either when the electric field is applied or is not applied. The term "medium" encompasses a liquid crystalline medium, a liquid crystal material, a liquid crystal mixture, and a dielectric material or layer, or any similar terms or derivations thereof, all such terms being used essentially interchangeabley but more often simply referred to as "medium" in being "optically isotropic" is meant that the medium is at least macroscopically isotropic in the visible light wavelength region (i.e., in a scale equal to or larger than a wavelength scale of the visible light). In lieu of such a medium that is optically isotropic when the electric field (field) is applied, or when no electric field (field) is applied, the present invention may use a medium that is optically anisotropic when no electric field is applied and a magnitude of the optical anisotropy is changed by and according to the electric field applied thereon.

Figure 7:
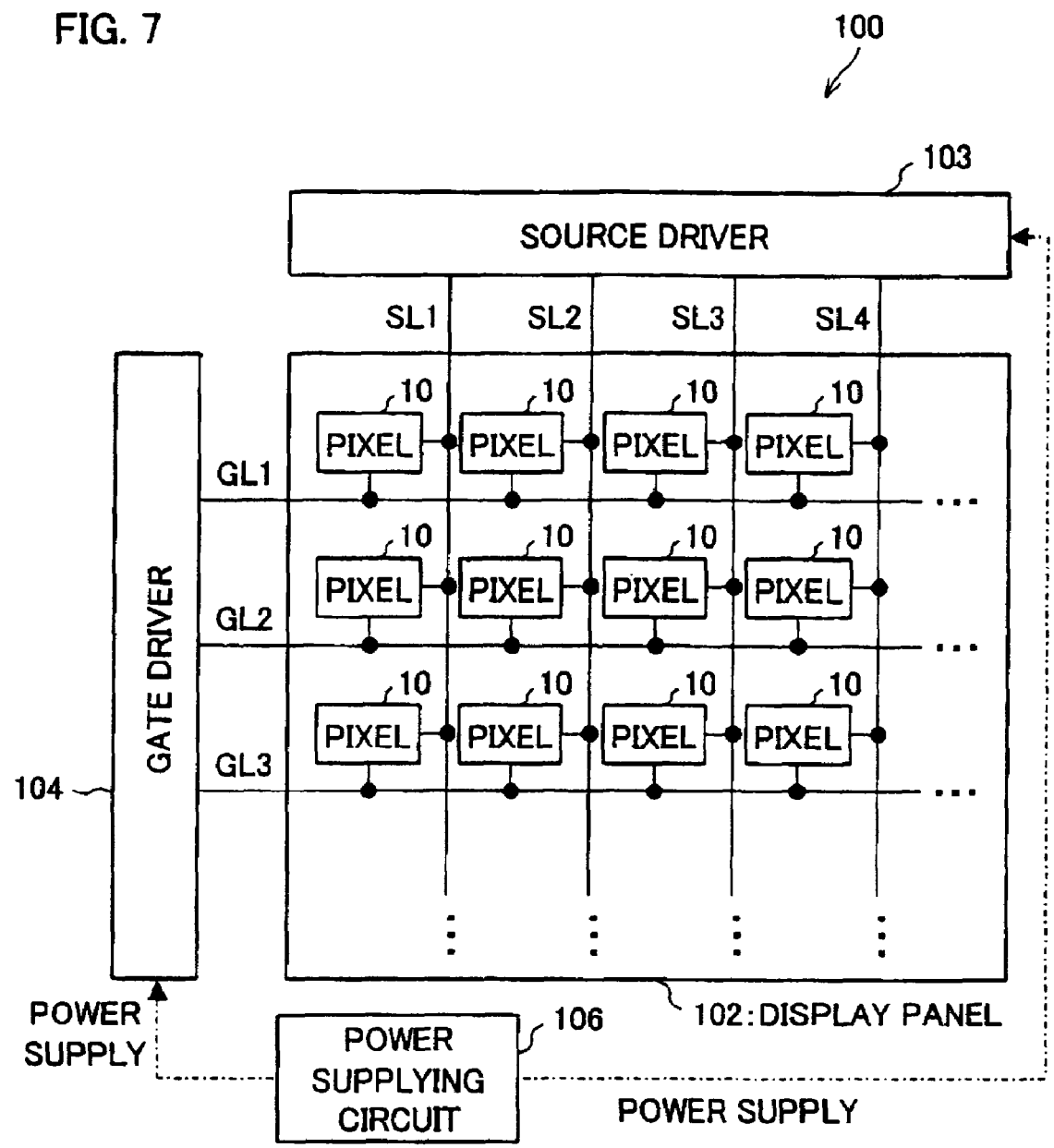
FIG. 7 is a block diagram for schematically illustrating an arrangement of essential parts of a display device in which the display element according to the present invention is used.
Figure 8:
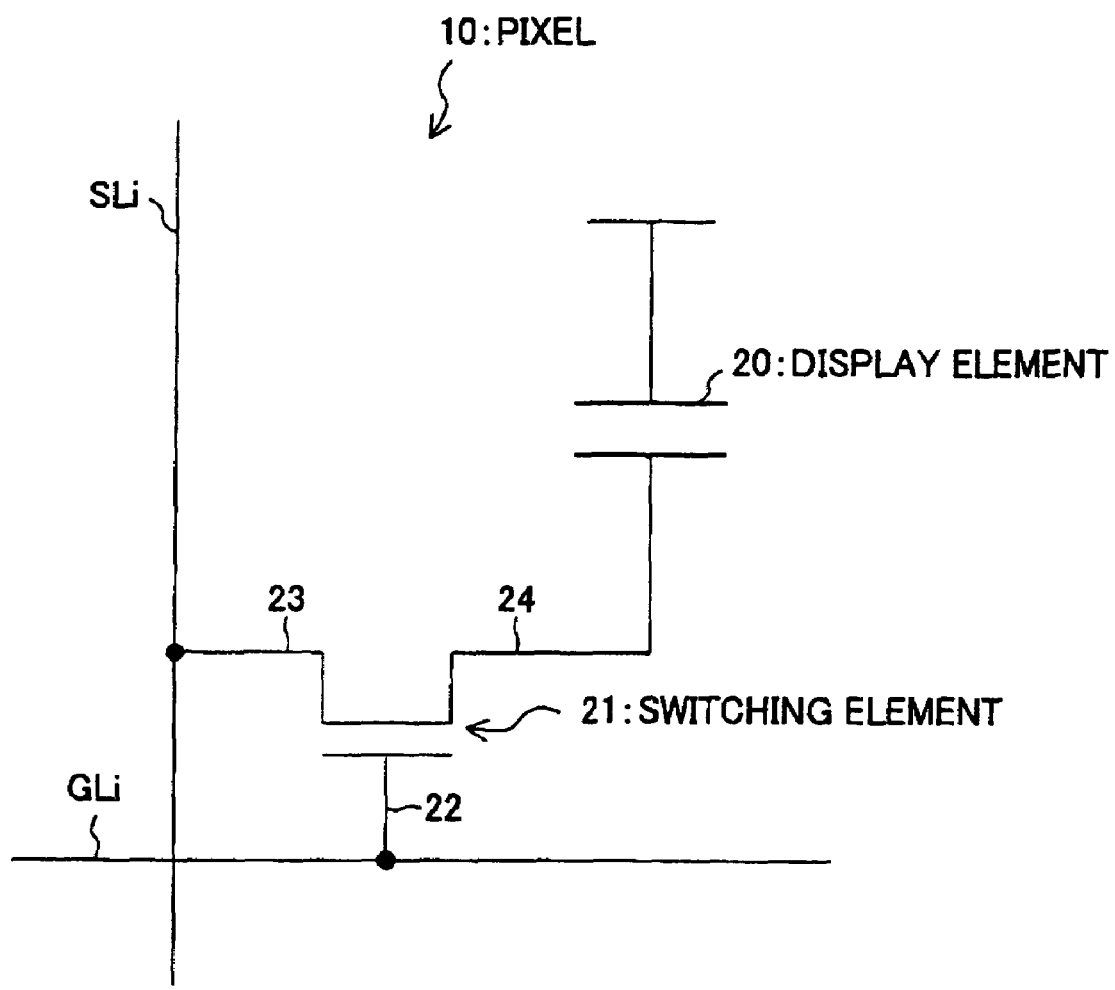
FIG. 8 is a view schematically illustrating an arrangement of periphery of the display element used in the display device illustrated in FIG. 7.

The display element according to the present embodiment is used by being provided in the display device. A driving circuit, signal lines (data signal lines), scanning lines (scanning signal lines), switching element or the like are also provided in the display device. FIG. 7 is a block diagram schematically illustrating essential portions of the display device in which the present display element is used. FIG. 8 is a view schematically illustrating an arrangement of periphery of the present display element (display element 20) used in the display device illustrated in FIG. 7.

As illustrated in FIG. 7, a display device 100 according to the present embodiment is provided with (a) a display panel 102 in which pixels 10 are arranged in matrix, (b) a source driver 103 and gate driver 104, which function as driving circuits, and (c) a power supplying circuit 106, (d) and the like.

Each pixel 10 is, as illustrated in FIG. 8, provided with a present display element (display element 20) and a switching element 21.

Moreover, the display panel 102 is provided with a plurality of data signal lines SL1 to SLn (n is an arbitral integer not less than 2) and a plurality of scanning lines GL1 to GLm (m is an arbitral integer not less than 2), which respectively cross the data signal lines SL1 to SLn. Corresponding to each intersection of the data signal lines SL1 to SLn and the scanning signal lines GL1 to GLm, the pixels 10 are respectively provided.

The power supplying circuit 106 supplies a voltage to the source driver 103 and the gate driver 104 in order to cause the display panel 102 to perform display operation. When the voltage is supplied, the source driver 103 drives the data signal lines SL1 to SLn of the display panel 102 and the gate driver 104 drives the scanning signal lines GL1 to GLm of the display panel 102.

The switching element 21 may be, for example, an FET (Field Effect Transistor), a TFT (Thin Film Transistor), or the like. In FIG. 8, the switching element 21 is connected to the scanning signal lines GLi via its gate electrode 22, and to data signal line SLi via its source electrode 23. Further, the switching element 21 is connected to the display element 20 via its drain electrode 24. Moreover, another terminal of the present display element 20 is connected to a common electrode line (not illustrated), which is commonly connected to all the pixels 10. With this arrangement, the switching element 21 is turned ON so as to supply a signal voltage to the display element 20 via the data signal line SLi (i is an integer not less than 1) from the source driver 103 when the scanning signal line GLi (i is an integer not less than 1) is selected, the signal voltage determined in accordance with a display data signal inputted from a controller (not illustrated). During a period in which the switching element 21 is turned OFF after an end of a period in which the scanning signal line GLi is selected, the display element 20 ideally keeps the voltage that it holds when the turning-OFF of the display element 20 is carried out.

As illustrated in FIG. 2, the present display element is so arranged that a dielectric material layer (dielectric liquid layer) 3 is provided between two transparent substrates (substrates 1 and 2) that face each other. The dielectric material layer is an optical modulation layer. On facing surfaces (internal surfaces) of the substrates 1 and 2, electrodes (transparent electrodes) 4 and 5 are provided respectively. The electrodes 4 and 5 are electric field applying means for applying an electric field on the dielectric material layer 3. Further, the alignment films 8 and 9 are respectively provided over the electrodes 4 and 5 on the internal surfaces of the substrates 1 and 2. Moreover, on outer surfaces (which are opposite to the facing surfaces) of the substrates 1 and 2, polarizers 6 and 7 are respectively provided.

The substrates 1 and 2 are glass substrates. Moreover, a gap between the substrates in the present display element, that is, a thickness of the dielectric material layer 3 is 5 μm. Moreover, the electrodes 4 and 5 are made of ITO (Indium Tin Oxide).

Figure 3:
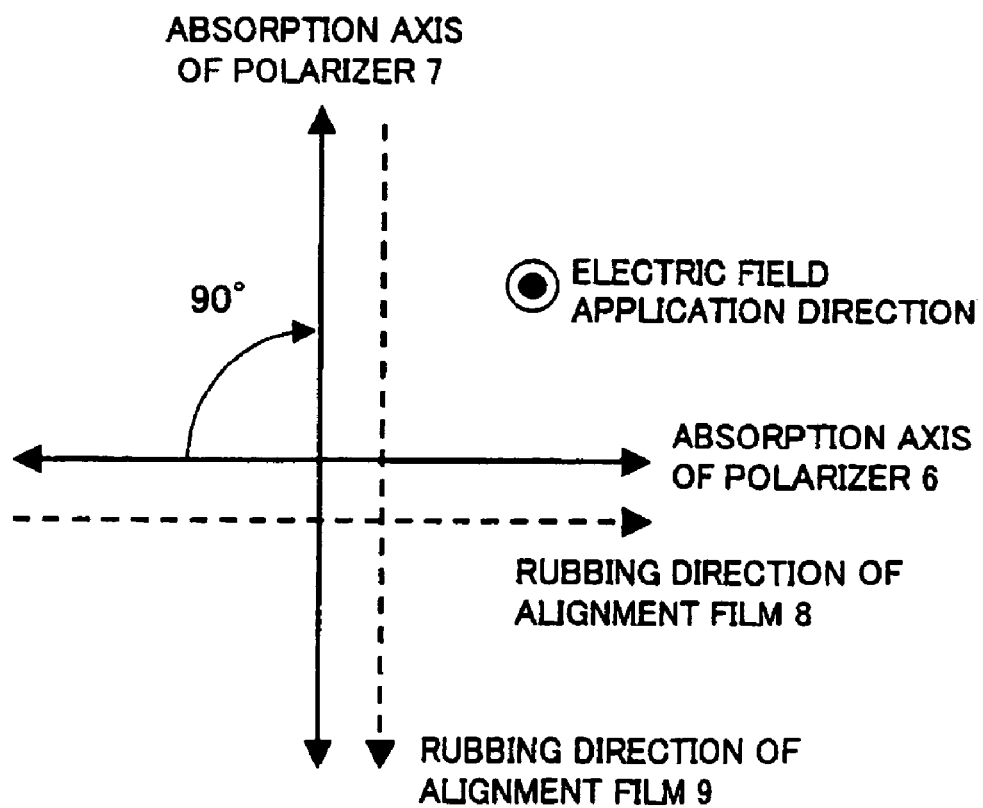
FIG. 3 is a view for explaining rubbing directions of alignment films and absorption axial directions of polarizers in the display element according to the embodiment of the present invention.

FIG. 3 is a view for explaining rubbing directions of the alignment films 8 and 9, and absorption axial direction of the polarizers 6 and 7. As illustrated in FIG. 3, rubbing treatment (alignment treatment) of the alignment films 8 and 9 is so performed that the rubbing directions (alignment directions)

of the alignment films 8 and 9 cross each other perpendicularly. The alignment films 8 and 9 are made of polyimide.

Moreover as illustrated in FIG. 3, the polarizers 6 and 7, whose respective absorption axes cross each other perpendicularly, are arranged such that the absorption axial direction of the polarizer 6 and the rubbing direction of the alignment film 8 are parallel (the absorption axial direction of the polarizer 6 and the rubbing direction of the alignment film 8 are identical), and that the absorption axial direction of the polarizer 7 and the rubbing direction of the alignment film 9 are parallel. The polarizers 6 and 7 may be arranged such that the absorption axial direction of the polarizer 6 and the rubbing direction of the alignment film 9 are parallel, and that the absorption axial direction of the polarizer 7 and the rubbing direction of the alignment film 8 are parallel.

The dielectric material layer 3 is formed by sealing a negative type liquid crystalline mixture (medium) between the substrates 1 and 2. The negative type liquid crystalline mixture contains a compound 1-1 (30 wt %), a compound 1-2 (40 wt %) and a compound (30 wt %). The compounds 1-1, 1-2, and 1-3 are respectively represented by:

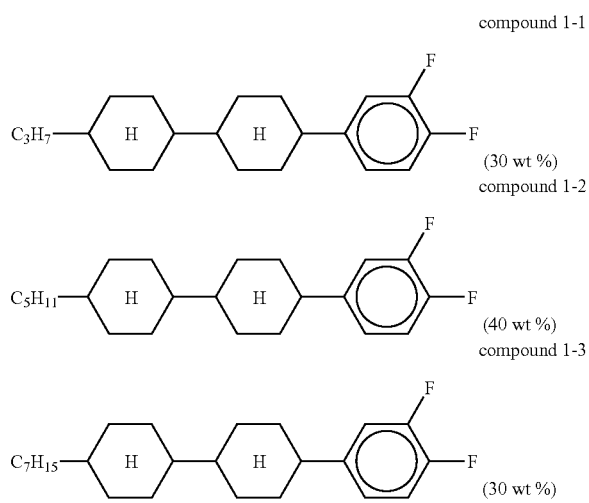

compound 1-1 (30 wt %)

compound 1-2 (40 wt %)

compound 1-3 (30 wt %)

Here, how to manufacture the present display element is described. To begin with, the electrodes 4 and 5 are respectively formed on surfaces of the substrates 1 and 2. The formation of the electrodes 4 and 5 may be carried out in the same manner as conventional manufacturing method of liquid crystal display element.

Next, the alignment film 8 is formed on the substrate 1 such that the alignment film 8 covers the electrode 4, whereas the alignment film 9 is formed on the substrate 2 such that the alignment film 9 covers the electrode 5. The alignment films 8 and 9 have been subjected to the rubbing treatment. Moreover, the rubbing directions of the alignment films 8 and 9 cross each other perpendicularly.

Moreover, the polarizers 6 and 7 are stuck onto those surfaces of the substrates 1 and 2 which are opposite to the surfaces thereof on which the electrodes 4 and 5 are respectively formed. The polarizers 6 and 7 are stuck onto the surfaces such that the absorption axes of the polarizers 6 and 7 cross each other perpendicularly, and the absorption axial directions of the polarizers 6 and 7 are necessarily identical with either the rubbing direction of the alignment film 8 or that of the alignment film 9.

Next, the substrates 1 and 2 are assembled together with a gap (thickness of the dielectric material layer 3) of 5 μm therebetween formed by interposing a spacer (not illustrated) therebetween. The spacer can be, for example, plastic beads or the like. A sealing material (not illustrated) is applied around the edges of the assembled substrates, thereby sealing off the edges and fixing the assembling. In applying the sealing material, a portion that will be an inlet for injecting the dielectric material (dielectric liquid) is not sealed off but kept open. The spacer and the sealing material are not limited to particular materials. Materials that are conventionally used for the liquid crystal display element are applicable as the materials of the spacer and the sealing material.

After assembling the substrates 1 and 2 as such, the medium is injected into the gap between the substrates 1 and 2). The medium is a mixture of the negative type liquid crystalline mixture. The negative type liquid crystalline mixture contains the compound 1-1 (30 wt %), the compound 1-2 (40 wt %), and the compound 1-3 (30 wt %). The negative type liquid crystalline mixture shows a negative type nematic liquid crystal phase at temperatures less than 113° C., and shows an isotropic phase at temperatures not less than 113° C.

Transmittance of the present display element thus prepared could be changed by applying an electric field between the electrodes 4 and 5, while the present display element being kept at a temperature near above a nematic phase-isotropic phase transition point Tni (that is, at a temperature slightly above Tni, for example, at Tni+0.1 K) by using an externally provided heating device. That is, the transmittance of the dielectric material layer 3 could be changed by applying the electric field between the electrodes 4 and 5 when the medium of the dielectric material layer 3 was caused to be isotropic by keeping the medium at the temperature slightly above the liquid crystal phase-isotropic phase transition point (Tni) of the medium.

Moreover, a maximum contrast of the present display element was 500. Here, the maximum contrast is a value obtained by dividing the maximum transmittance by a minimum transmittance (transmittance attained when no electric field is applied). That is, the maximum contrast=the maximum transmittance/minimum transmittance. Moreover, coloring phenomenon occurred in the present display element was almost unnoticeable, even when the electric field is applied.

Figure 4:
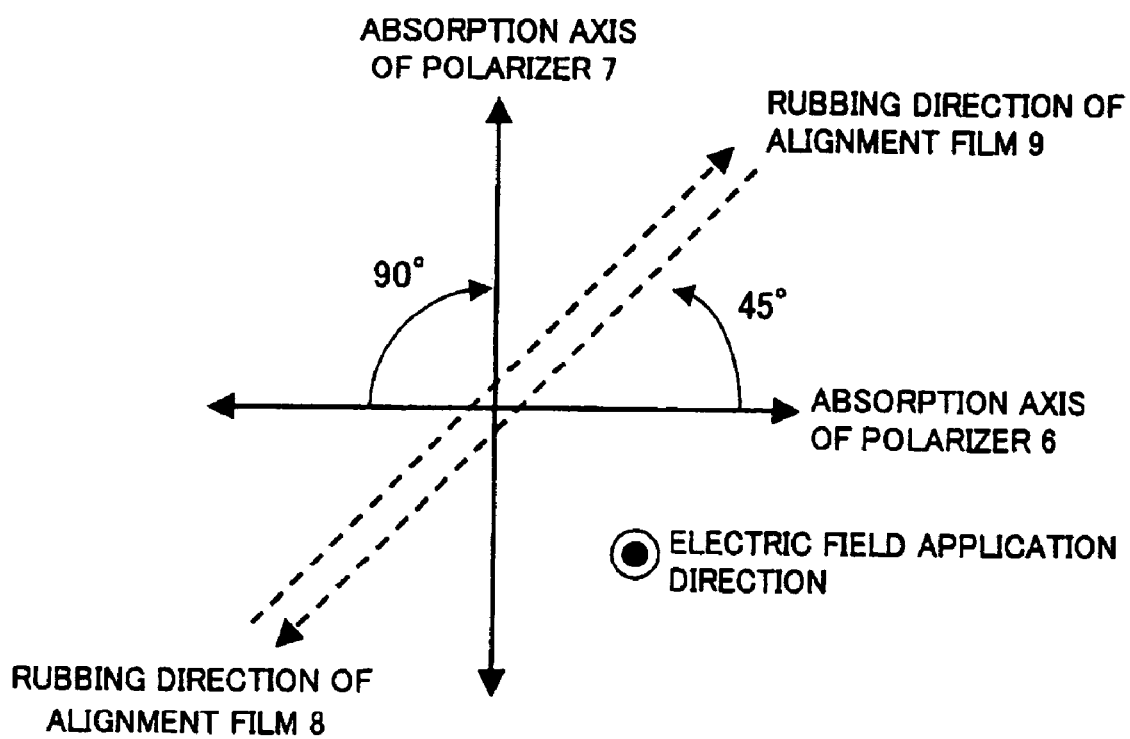
FIG. 4 is a view for explaining rubbing directions of alignment films and absorption axial directions of polarizers in a comparative display.

On the other hand, for making a comparison with the present display element, a comparative display element was prepared, which was made similarly to the present display element except that the rubbing directions of the alignment films 8 and 9 in the comparative display element are arranged differently from in the present display element. FIG. 4 illustrates that the rubbing directions of alignment films 8 and 9 and absorption axial directions of polarizers 6 and 7 in the comparative display element.

As illustrated in FIG. 4, in the comparative display element, the rubbing directions of the alignment films 8 and 9 are parallel but in opposite directions. In this case, electric field application causes molecules of a medium of the dielectric material layer 3 to orient such that the molecules near the substrates are oriented in one direction thereby causing a homogeneous structure.

Moreover, as illustrated in FIG. 4, the comparative display element is arranged such that the rubbing directions of the alignment films 8 and 9 make 45 degrees with the absorption axial directions of the polarizers 6 and 7. The absorption axial directions of the polarizers 6 and 7 cross each other perpendicularly.

In the comparative display element thus prepared, the transmittance was also changeable by and according to applying the electric field between the electrodes while keeping the medium at a temperature near the nematic-isotropic phase transition point by using an externally provided heating device.

However, a maximum contrast of the comparative display element was 250, which is lower than that of the present display element. Moreover, in the comparative display element, coloring phenomenon in which a display surface became yellowish was observed when the electric field was applied.

Moreover, the present display element according to the present embodiment attains a higher contrast than the comparative display element. This is because the lowest transmittance (transmittance attained when no electric field is applied) is higher in the comparative display element than in the present display element. Because the lowest transmittance is higher in the comparative display element, light leakage is caused in the comparative display element when no electric field is applied. Specifically, there are two causes for the light leakage in the comparative display element when no electric field is applied, thereby causing the lower contrast. The two causes are:

1. phase difference that the rubbed alignment films cause; and 2. phase difference that the molecules adhered on the alignment films cause.

On the other hand, the light leakage due to these causes will not occur in the present display element. The reason is as follows: Even if it occurs, the phase difference occurs in the vicinities of the alignment films (in the vicinities of the substrates). In the present display element, the phase difference occurred in the vicinities of the substrates will not contribute to the transmittance when no electric field is applied, because the rubbing directions of the alignment films 8 and 9 are perpendicular or parallel to the absorption axes of the polarizers 6 and 7.

Moreover, the coloring phenomenon occurred in the present display element according to the present embodiment is unnoticeable, while the coloring phenomenon occurred in the comparative display element is noticeable. This is because the molecules in the present display element are oriented in the twist structure meanwhile, in the comparative display element, the molecules are oriented in the homogeneous structure in which the molecules are oriented in one direction. That is, it is considered that the coloring phenomenon is due to the wavelength dispersion caused by the refractive index of the molecules. It is hypothesized that the arrangement in which the molecules are oriented in the twist structure as in the present display element is less susceptible to the wavelength dispersion than the homogeneous structure as in the comparative display element.

Figure 1:
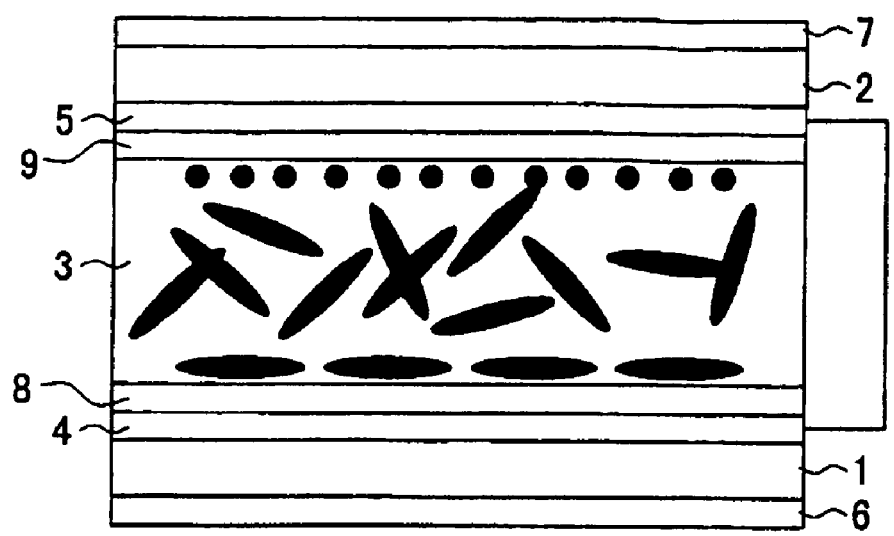
FIG. 1(*a*) is a schematic cross sectional view for explaining orientation of molecules in a display element according to one embodiment of the present invention when no electric field is applied.
Figure 1:
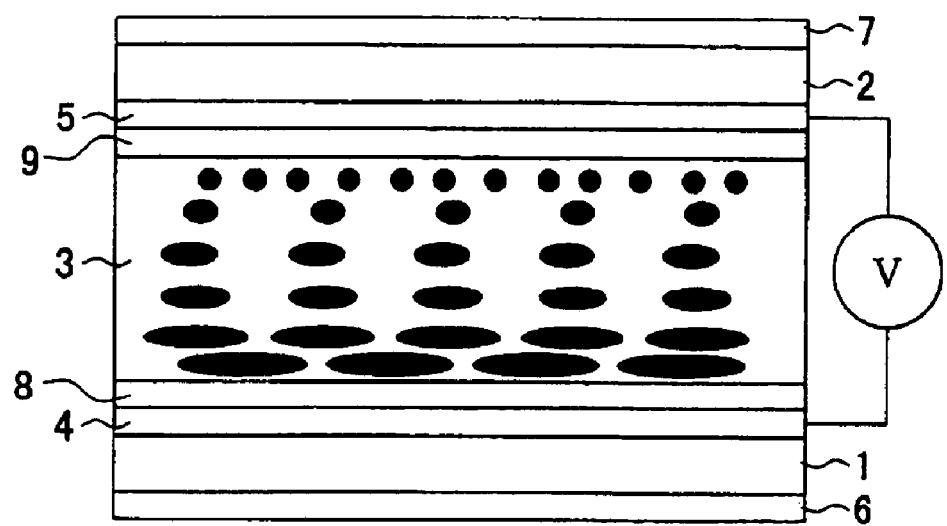
Figure 5:
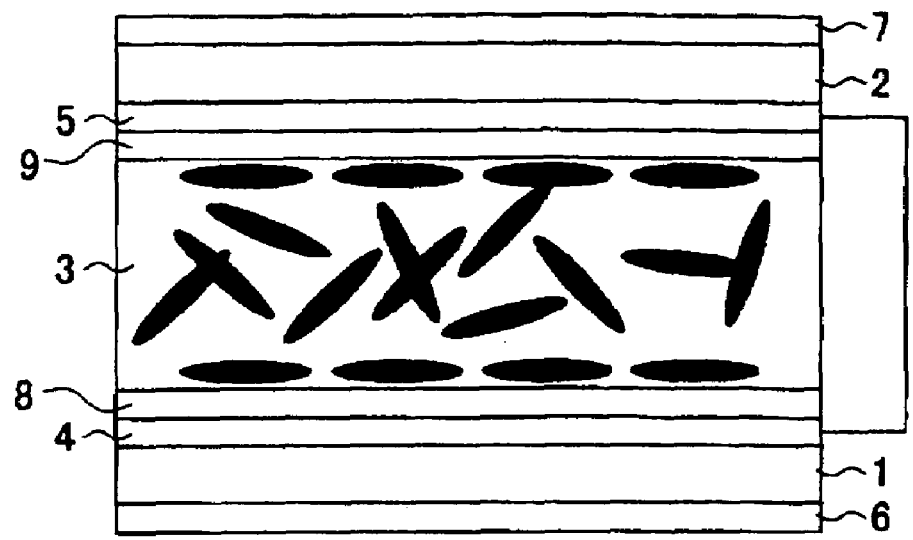
FIG. 5(a) is a schematic cross sectional view for explaining orientation of molecules in the comparative display element when no electric field is applied.
FIG. 5(b) is a schematic cross sectional view for explaining orientation of molecules in the comparative display element when an electric field is applied.
Figure 5:
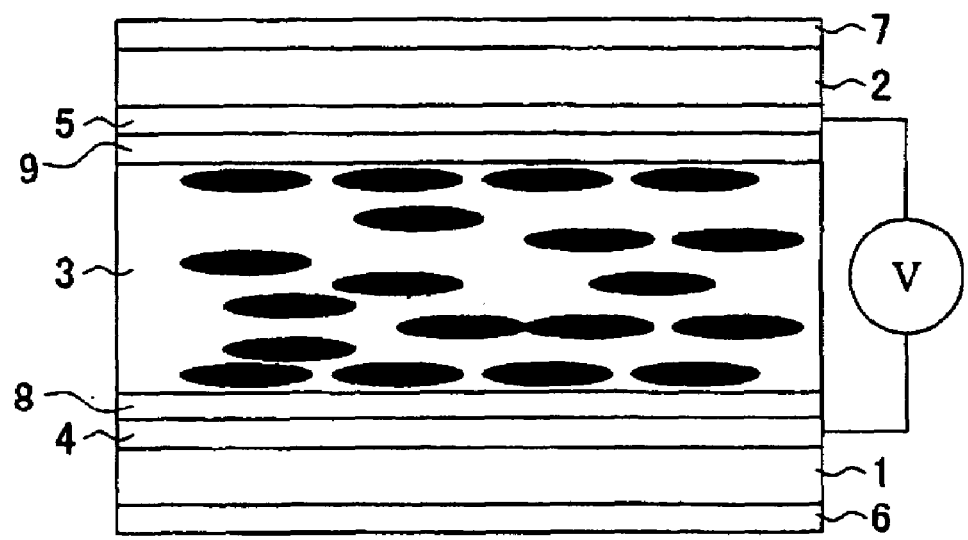

The following explains, in detail, the difference in the molecular orientation between the present display element and the comparative display element, referring to FIGS. 1(a), 1(b), 5(a), and 5(b). FIG. 1(a) is a schematic cross sectional view for explaining the orientation of the molecules in the present display element when no electric field is applied. FIG. 1(b) is a schematic cross sectional view for explaining orientation of the molecules in the present display element when the electric field is applied. FIG. 5(a) is a schematic cross sectional view for explaining orientation of the molecules in the comparative display element when no electric field is applied. FIG. 5(b) is a schematic cross sectional view for explaining orientation of the molecules in the comparative display element when the electric field is applied.

As illustrated in FIG. 1(a), in the present display element, the molecules in the vicinity of the surface of one substrate (alignment film) (that is, the molecules adhered on the surface of the substrate) are oriented in a direction along the rubbing direction of the one substrate and perpendicular to a direction (that is, rubbing direction of the other substrate) in which the molecules in the vicinity of the surface of the other substrate (the other alignment film) (that is, the molecules adhered on the surface of the other substrate) are oriented. Moreover, as illustrated in FIG. 1(b), when the electric field is applied, the major axial directions of the molecules are oriented parallel to the surfaces of the substrates and arranged in a helical structure.

On the other hand, as illustrated in FIG. 5(a), in the comparative display element, the molecules in the vicinities of the substrates (alignment films) are oriented parallel to each other along the rubbing directions of the substrates when no electric field is applied. Moreover, as illustrated in FIG. 5(b), when the electric field is applied, the major axial directions of the molecules are oriented parallel to the surfaces of the substrates and in one direction. That is, in the comparative display element, the electric field application causes the molecules to be oriented in a homogeneous structure.

As described above, the molecules are oriented in the twisted structure in the present display element. Therefore, the present display element is less susceptible to wavelength scattering of the refractive index, and thus it is possible to suppress the coloring phenomenon in the present display element. In the present display element, there are leftward twisted structure and rightward twisted structure, and thus multi-domains are formed. Thus, the transmittance is low in boundaries between the domains.

In view of this, the present display element may be arranged such that a chiral agent is added in the medium for the dielectric material layer 3 in advance. The chiral agent in the medium causes the medium to have only one of the leftward twisted structure and rightward twisted structure, thereby attaining better transmittance.

Alternatively, the present display element may be arranged such that the medium (dielectric liquid) of the dielectric material layer 3 is chiral itself (a chiral material). This arrangement also causes the medium to have only one of the leftward twisted structure and rightward twisted structure, thereby attaining better transmittance.

Moreover, in the present display element, the rubbing directions of the alignment films 8 and 9 cross each other perpendicularly, and respectively identical (parallel) with the respective absorption axial directions of the polarizers 6 and 7. However, the present invention is not limited to these arrangement. As long as the rubbing directions of the alignment films 8 and 9 cross each other perpendicularly, the contrast can be improved.

Specifically speaking, as long as the rubbing directions of the alignment films 8 and 9 cross each other perpendicularly, the phase differences occurred in the vicinities of the substrates when no electric field is applied, that is, the phase difference caused by the rubbed alignment films and the phase difference caused by the molecules adhered on the alignment films cross each other perpendicularly and thus cancel out each other. As a result, the phase differences do not contribute to the transmittance.

However, perfect effect cannot be obtained if the magnitudes of the phase differences occurred in the respective vicinities of the substrates are utterly identical. For example, if the alignment films are different in thickness or rubbing strength, the light leakage cannot be prevented perfectly, thereby causing lower contrast. Thus, for ensuring the prevention of the light leakage, it is preferable that the rubbing directions of the alignment films 8 and 9 be respectively identical with the absorption axial directions of the polarizers 6 and 7. With this arrangement, it is possible to further improve the contrast.

Moreover, even thought the present display element is so arranged that the substrates 1 and 2 are glass substrates, the present invention is not limited to this arrangement, provided that at least one of the substrates 1 and 2 is transparent. Further, even though the gap between the substrates 1 and 2 is 5 μm in the present display element, the gap is not limited to this arrangement, and may be arbitrarily set in the present invention. However, it is preferable that a product of Δn and d be such a value that allows a maximum light utilization efficiency in perpendicular twisted orientation mode (that is, TN mode), where Δn is the refractive anisotropy of the liquid crystalline medium and d is the thickness of the dielectric material layer. Specifically, it is preferable that the phase difference (Δn×d) occurred in the isotropic phase temperature range be such that 350 (nm)≦Δn×d≦650 (nm). Here, it is desirable that the refractive anisotropy Δn be a value measured at a temperature closer to a temperature at which the isotropic phase appears. For the refractive anisotropy Δn, as described above, it is only required that the refractive anisotropy Δn be a value measured at 550 nm when the medium is in the nematic phase. However, it is preferable that the refractive anisotropy Δn be a value measured at the temperature closer to the temperature at which the isotropic phase appears. The refractive anisotropy Δn be a value measured at such a temperature that is closer to the temperature Tni (K) at which the isotropic phase appears, for example, at TK (Tk(K)=Tni (K)−5(K)) for ensuring that the medium has the nematic phase. Moreover, in the embodiment the electrodes 4 and 5 are made of ITO. However, the present invention is not limited to this arrangement, provided that at least one of the electrodes 4 and 5 is made of a transparent electrode material.

Moreover, even though the present display element is so arranged that the alignment films 8 and 9 made of polyimide are provided, the present invention is not limited to this arrangement. For example, alignment films made of polyamic acid may be used in the present invention. Or, polyvinylalcohol, silane coupling agent, polyviniycinnamete, or the like may be used in the present invention. In case where polyamic acid or polyviniyalcohol is adopted, polyamic acid or polyviniyalcohol is applied (embrocated) on the substrates so as to form the alignment films and then the alignment films thus formed are rubbed. Moreover, in case where the silane coupling agent is used, a pulling method may be adopted to prepare the alignment films, as in an LB film. Moreover, in case where polycinnamate is used, polycinnamate is embrocated applied (embrocated) on the substrates so as to form the alignment films and then the alignment films thus formed are subjected to UV (ultra violet) radiation.

Moreover, the medium for the dielectric material layer 3 in the present embodiment is not limited to the mixture exemplified above. However, it is preferable that the medium for the dielectric material layer 3 be rod-like molecules having a negative dielectric anisotropy. That is, it is preferable that the medium for the dielectric material layer 3 be such rod-like molecules that its dielectric constant in molecular major axial direction is smaller than its dielectric constant in molecular miner axial direction (dielectric constant in molecular major axial direction<dielectric constant in molecular miner axial direction).

That is, it is more preferable that the medium for the dielectric material layer 3 be a material made from a liquid crystal compound or be a medium that contains the liquid crystalline compound. Here, the "liquid crystalline compound" refers to a compound that shows liquid crystal phase, such as nematic phase, smectic phase, or the like, at low temperatures. Moreover, it is especially preferable that the medium for the dielectric material layer 3 be a medium made from a negative type liquid crystalline compound, or a medium containing the negative type liquid crystalline compound.

Moreover, the medium for the dielectric material layer 3 may be a compound liquid crystalline simple substance) that solely shows the liquid crystal property, or a mixture that shows its liquid crystalline property when a plurality of substance are mixed together. Further, the liquid crystalline material may be a mixture of (a) such liquid crystalline simple substance or such liquid crystalline mixture, and (b) a non-liquid crystalline material.

Any medium may be used as the medium for the dielectric material layer 3. Examples of the medium having the negative dielectric anisotropy includes a mixture of, among from the liquid crystalline materials described in aforementioned Patent Publication (Tokukai, No. 2001-249363), 3HPFF, 5HPFF, and 7HPFF. (the mixture is referred to as a negative type liquid crystalline mixture (3)). The "3HPFF" refers to 1,2-difluoro-4-[trans-4-(trans-4-n-propylcyclohexyl) cyclohexyl]benzene. The "5HPFF" refers to 1,2-difluoro-4-[trans-4-(trans-4-n-pentylcyclohexyl) cyclohexyl]benzene. The "7HPFF" refers to 1,2-difluoro-4-[trans-4-(trans-4-n-pentylcyclohexyl) cyclohexyl]benzene. Or, a medium prepared by mixing a liquid crystalline material of these kinds in a solvent.

Moreover, the medium for the dielectric material layer 3 may be a medium that is substantially optically isotropic when no electric field is applied, and in which optical modulation is induced by electric field application. That is, typically, the medium may be a material (medium) in which a orientational order parameter of the molecules or the molecular agglomerations (clusters) is increased (from a level of orientational order parameter attained when optical modulation has been already caused) by the electric field application.

Moreover, in the present invention, the medium for the dielectric material layer 3 may be, for example, a material that has an orderly structure (orientational order) smaller than the wavelength of light, and that can have a liquid phase that appears isotropic optically but has a negative dielectric anisotropy. Further, the medium may be a system in which the molecules (liquid crystal molecules) form agglomerations (molecular agglomerations, clusters) in which they are oriented radiately in a size smaller than wavelength of light so that the system seems to be optically isotropic. By applying the electric field on such the medium (material, system, or the like), micro structures of the molecules or the molecular agglomerations (clusters) are distorted thereby inducing the optical modulation. Moreover, again in case where any of these media is used, the orientation of the molecules can be promoted by arranging such that the medium contains an orientation auxiliary material. By promoting the orientation of the molecules, it becomes possible to drive the display element with a low voltage.

The medium may be, for example, a mixture system of 3HPFF, 5HPFF, and 7HPFF. This mixture system has a negative dielectric anisotropy.

As described above, the mixture system of 3HPFF, 5HPFF, and 7HPFF is transparent because it has an orderly structure smaller than the optical wavelength. That is, the mixture system is optically isotropic when no electric field is applied. Therefore, by arranging the present display element according to the present embodiment to adopt this mixture system therein, the present display element becomes possible to perform good black display with crossed nicols configuration.

On the other hand, by applying a voltage (electric field) between the electrodes 4 and 5 while keeping the temperature of the mixture system within the temperature range in which the mixture system is optically isotropic, the structure that shows the optical isotropy is distorted thereby causing the optical anisotropy. That is, the mixture system is optically isotropic when no electric field is applied, but becomes optically anisotropic by electric field application.

The present display device having this arrangement is capable of performing good white display because the structure that shows the optical isotropy is distorted by the electric field application thereby causing birefringence. The birefringence occurs in a constant direction and its magnitude is changeable according to the electric field application. Moreover, a voltage-transmittance curve that represents the relationship between the voltage applied between the electrodes 4 and 5, and the transmittance becomes a stable curve. That is, in the display element having this arrangement, and the display device provided with the display element, it is possible to attain a stable voltage-transmittance curve within the temperature range at which the mixture system is optically isotropic when no electric field is applied. Thus, in the display element having this arrangement, and the display device provided with the display element, temperature control is very easy.

The following explains difference in terms of display principle between the liquid crystal display elements of conventional display modes and the present display element according to the present embodiment in which the medium is such that the optical anisotropy of the molecules are changeable by and according to the electric field application, like the mixture system.

Figure 6:
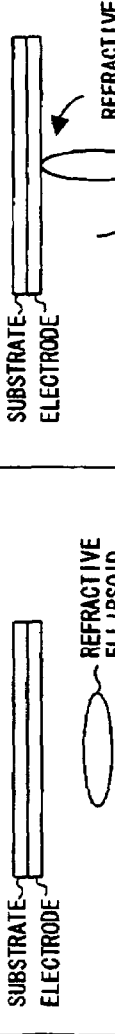
FIG. 6 is a view for explaining differences in display principle between the display element according to the embodiment of the present invention, and conventional liquid crystal display elements.

FIG. 6 is a diagram for explaining the difference in the display principle between the liquid crystal elements of the conventional display modes and the present display element in which the mixture system is used. FIG. 6 schematically illustrates shapes and directions of refractive ellipsoids when the electric field is applied and when no electric field is applied. FIG. 6 depicts the display principles of the TN (Twisted Nematic) mode, VA (Vertical Alignment) mode, IPS (In Plane Switching) mode as the conventional display modes.

As illustrated in FIG. 6, the liquid crystal display element of the TN mode is arranged as follows: a liquid crystal layer is sandwiched between a pair of substrates that face each other. On the substrates, transparent electrodes (electrodes) are respectively provided. When no electric field is applied, major axial directions of liquid crystal molecules are in a helical orientation in the liquid crystal layer. When the electric field is applied, the major axial directions of the liquid crystal molecules are oriented along an electric field direction.

In this case, when no electric field is applied an average refractive ellipsoid is oriented in such a manner that its major axial direction is parallel to the substrate surface (substrate in-plane direction), as illustrated in FIG. 6. When the electric field is applied, the major axial direction is oriented along the substrate normal direction, as illustrated in 6. That is, the refractive ellipsoid makes almost no change in (does not substantially change) its shape depending on whether the electric field is applied or not. However, the refractive ellipsoid changes its major axial direction (the refractive ellipsoid is rotated) depending on whether the electric field is applied or not.

As illustrated in FIG. 6, the liquid crystal display element of VA mode is arranged as follows: a liquid crystal layer is sandwiched between a pair of substrates that face each other. On the substrates, transparent electrodes (electrodes) are provided respectively. When no electric field is applied, major axial directions of liquid crystal molecules are oriented substantially perpendicular to a substrate surface. When a electric field is applied, the major axial directions of the liquid crystals directions are oriented along a direction perpendicular to an electric field. When no electric field is applied, the average refractive ellipsoid in this case is, as illustrated in FIG. 6, directed in such a manner that its major axial direction is along the normal direction of the surfaces of the substrates. When the electric field is applied, however, the average refractive ellipsoid is directed in such a manner that its major axis is parallel to the surfaces of the substrates. That is, the shape of the refractive ellipsoid is ellipsoidal regardless of whether the electric field is applied or not. However, the major axial direction of the average refractive ellipsoid is changed (the average refractive ellipsoid is rotated) between when the electric field is applied and when no electric field is applied, whereas the shape of the refractive ellipsoid is not changed substantially.

Moreover, as illustrated in FIG. 6, the liquid crystal display element of IPS mode is arranged as follows: On a substrate, a pair of electrodes are provided in such a manner that they face each other. A liquid crystal layer is sandwiched between the substrate and a substrate that is not illustrated here. An electric field is applied across the liquid crystal layer by using the electrodes, thereby changing orientational directions of liquid crystal molecules (major axial direction of a refractive ellipsoid) in the liquid crystal layer. In this way, display state is changed between when no electric field is applied and when the electric field is applied. That is, again in the case of the liquid crystal display element of IPS mode as in the liquid crystal display elements of TN mode and VA mode, the refractive ellipsoid makes almost no change (does not substantially change) in its shape depending on whether the electric field is applied or not as illustrated in FIG. 6, whereas the refractive ellipsoid changes its major axial direction (the refractive ellipsoid is rotated) depending on whether the electric field is applied or not.

As described above, the conventional liquid crystal display elements are arranged such that the liquid crystal molecules are oriented along a certain direction (typically in one direction) even when no electric field is applied, and that display operation (modulation in transmittance) is carried out by changing the orientational directions of the molecules together at once by applying the electric field. That is, in the conventional liquid crystal display element, display operation is carried out by utilizing rotation (change) of the direction (major axial direction) of the refractive ellipsoid, whose shape is not changed substantially. In other words, the conventional liquid crystal display element is so arranged that the orientational order parameter of the liquid crystal molecules is substantially constant, and that the display operation (modulation in transmittance) is carried out by changing the orientational direction.

On the contrary to those conventional display modes, the molecules are directed in many directions when no electric field is applied, in the present display element in which a mixture system of 3HPFF, 5HPFF, and 7HPFF is used. However, their molecules have the order (orderly structure, orientational order) smaller than the wavelength scale of light and thus do not cause the optical anisotropy (orientational order parameter≈0 in the scale equal to or larger than the visible light. Thus, as illustrated in FIG. 6, when no electric field is applied, the refractive ellipsoid of the molecules has a spherical shape unlike the conventional liquid crystal display element.

However, when the electric field is applied, the respective molecules that have negative dielectric anisotropy are oriented along in-plane directions of the substrates (directions parallel to the substrates), thereby changing the orientation state of the molecules. Moreover, at the same time, the orderly structure smaller than the light wavelength is distorted, thereby causing the optical anisotropy (the orientational order parameter>0 in the scale equal to or larger than the visible light). The major axial direction of the refractive ellipsoid 11*a* is directed along the direction parallel to the substrates, and are arranged helically (in a twist arrangement) from one of the substrates to the other. In the present display element in which the mixture system is used, the shape of the refractive molecular agglomeration is spherical and thus isotropic (nx=ny=nz) when no electric field is applied. The anisotropy appears in the shape of the refractive ellipsoid agglomeration that is spherical and anisotropic (nx>ny in the vicinity of the surface of the substrate located lower in the illustration; ny>nx in the vicinity of the surface of the substrate 1 located upper in the illustration) by electric field application as follows, for example: here, nx is a refractive index (main refractive index) of a direction parallel to the surfaces of the substrates and rightward/leftward directions in FIG. 6, and ny is a refractive index (main refractive index) of a direction parallel to the surfaces of the substrates and along a viewing direction (a direction perpendicular to the rightward/leftward directions), and nz is a refractive index (main refractive index) of a direction perpendicular to the surfaces of the substrates.

In the present invention, the orientational order parameter≈0 in the scale not less than the wavelength of visible light indicates that the orientational order parameter is such a state: when the orientational order parameter=0 in the scale not less than the wavelength of visible light, a majority of the Liquid crystal molecules or the like are oriented in a certain direction (there is an orientational order) when observed in a scale smaller than the wavelength of visible light, whereas, in the scale larger than the wavelength of visible light, the orientational directions of the molecules are averaged (that is, random) and there is no orientational order. Therefore, when the orientational order parameter≈0 in the scale not less than the wavelength of visible light, the orientational order parameter is so small that it causes no effect on the light in the wavelength range of visible light and the light larger than the wavelength of visible light. For example, when the orientational order parameter≈0 in the scale equal to or greater than the wavelength of visible light, the black display is realized under crossed nicols. Furthermore, in the present invention, "the orientational order parameter>0 in the scale equal to or greater than the wavelength of visible light" indicates that the orientational order parameter in the scale equal to or greater than the wavelength of visible light is greater than the orientational order parameter of substantially 0. For example, when the orientational order parameter>0 in the scale equal to or greater than the wavelength of visible light, the white display (and/or gray display, which is a gradation display) is realized under crossed nicols.

Moreover, the major axial direction of the refractive ellipsoid is always perpendicular to the electric field application direction. On the other hand, the display operation in the conventional liquid crystal display element is carried out by rotating the major axial direction of the refractive ellipsoid. Thus, the major axial direction of the refractive ellipsoid is not always perpendicular to the electric field application direction.

As described above, the direction of the optical anisotropy is constant (the direction of the voltage (electric field) application is not changed) in the present display element in which the mixture system of 3HPFF, 5HPFF, and 7HPFF is used. The display operation is carried out by modulating the orientational order parameter in the present display element. That is, in the present display element in which the mixture system is used, the anisotropy (or the orientational order) of the medium itself is changed to perform the display operation. Therefore, the display principle of the present display element in which the mixture system is used is largely different from the other liquid crystal display elements.

Moreover, in the present display element in which the mixture system is used, the distortion caused in the structure that shows the optical anisotropy, that is, the change in the magnitude of the optical anisotropy in the medium is utilized to perform the display operation. Therefore, a wider viewing angle property is realized in the present display element than in the conventional display modes in which the display operation is carried out by changing the orientational directions of the liquid crystal molecules. Further, in the present display element in which the mixture system is used, the birefringence occurs in one constant direction, and the optical axial direction is not changed. Thus, a wider viewing angle property is realized in the present display element.

Moreover, in the present display element in which the mixture system is used, the display operation is carried out by utilizing the anisotropy that is caused by distorting the structure (for instance, lattice that is like a crystal) of micro regions. Because of this, the present display element is free from such a problem associated with the display principle of the conventional display modes that inherent viscosity of the liquid crystal largely affects the response speed. It is possible to realize high-speed response of about 1 ms in the present display element. Specifically speaking, because the change in the orientational direction of the liquid crystal molecules is utilized in the display principle of the conventional modes, the inherent viscosity of the liquid crystal largely affects the response speed. On the contrary, in the present display element in which the mixture system is used, the distortion of the structures in the micro regions is utilized. Therefore, the effect given by the inherent viscosity of the liquid crystal is small and it is possible to attain the high-speed response in the present display element. Therefore, the high-speed response property allows the present display element to be applicable for example in a display device of field sequential color mode.

Moreover, the present display element may be expressed as a display element basically arranged such that (i) the electric field is applied along the normal direction of the surfaces of the substrates (vertical electric field application), (ii) the medium for the dielectric material layer 3 is a negative type liquid crystal (use of negative type liquid crystal), and (iii) the rubbing directions of the alignment films respectively provided on the substrates cross each other perpendicularly (twist rubbing).

Moreover, by forming a display device by using the present display element, it is possible to improve the contrast and suppress the coloring phenomenon in the display device in which the display element utilizes the electro-optical effect.

Moreover, by applying the present invention to a display device in which the Kerr effect is utilized, significant improvement in the contrast and suppression in the coloring phenomenon can be attained as well as high-speed response. Thus, the present invention is quite significant practically.

Moreover, the present invention may be expressed such that it relates to a display element that has such a display performance that high speed response and wide viewing angle are attained.

The present invention is not limited to the present embodiments which mainly discuss the arrangements in which the electric field application is the means for changing the magnitude of the optical anisotropy of the medium. In lieu of the electric field application, a magnetic field application may be used in order to change the magnitude of the optical anisotropy depending on whether or the magnetic field is applied.

That is, the magnetic field as well as the electric field is also applicable as the field to apply. In order to change the magnitude of the optical anisotropy of the medium by the magnetic field application, magnetic anisotropy of the medium is utilized. Therefore, in this case, a material having a larger anisotropy in terms of the magnetic susceptibility is preferable as the medium. In the case of organic molecules, the magnetic susceptibility is mainly due to diamagnetism. Thus, in case where the π electrons can be moved along a ring in a molecule according to the change in the magnetic field, an absolute value of the magnetic susceptibility becomes largest. Therefore, for example, in case where the molecule has an aromatic ring, the absolute value of the magnetic susceptibility becomes largest when the aromatic ring (a sequence of aromatic ring, a chain containing aromatic rings) is directed perpendicular to a direction along which the magnetic field is applied. In this case, the magnetic susceptibility observed along a direction to which the aromatic ring is parallel, is relatively smaller in absolute value than along a direction to which the aromatic ring is perpendicular. Thus, the anisotropy of the magnetic susceptibility is larger along the direction to which the aromatic ring is parallel. Therefore, a material having a ring structure such as a six-membered ring (for example, a benzene ring) is preferable as the medium. Moreover, in order to increase the anisotropy of the magnetic susceptibility, it is also preferable to orient electron spin in the medium. By introducing an electron spin in a free radical (radical) of N, O, NO, or the like, it is possible to give the molecules a stable spin. In this case, for example, it is possible to orient the spin parallel by piling conjugate molecules on the plane. In this case, for example, a discotic liquid crystal is preferable as the medium. In the discotic liquid crystal, core portions located at a center of the molecules are piled into columns.

In this case where the magnetic field is used as the field to apply, the display element may have such an arrangement, for example, that a magnetic field generating member (such as an electromagnet or the like) or the like is provided outside of the cell, for example, on an outer side of the display element 70, in lieu of the electric field applying members such as the electrodes 4 and 5, or the like. By applying the magnetic field, in lieu of the electric field, on the medium, it is possible to perform the same driving (addressing) as above.

Moreover, the field to apply may be light. There is no particular limit in terms of the wavelength of the light. For example, the magnitude of the optical anisotropy can be changed by and according to radiating, on the medium, light of 532 nm generated by an Nd (Neodymium): YAG (Yttrium Aluminum Garnet) laser.

The medium to be used in this arrangement is not particularly limited. In this arrangement, a medium in which the magnitude of the optical anisotropy is changeable by and according to the light radiation, because the Kerr effect due to light is utilized in this arrangement. The medium in this arrangement may be media similar to the media used in the arrangement in which the electric field is used, more specifically, the media mentioned in the first embodiment.

It is preferable that the medium contain a little amount of dye in the case where the light is used as the field to apply. By this arrangement in which the medium contains a little amount of dye, the magnitude of the optical anisotropy becomes more changeable than without the dye. Dye content in the medium is preferably 0.01 wt % or more, and less than 5 wt %. If the dye content was less than 0.01 wt %, the amount of the dye is too little to attain sufficient effect. On the other hand, if the dye content was 5 wt % or more, the dye absorbs exitation light.

In this arrangement, the medium may be, for example, the compound (liquid crystalline material) represented by Formula (1). The liquid crystalline material itself may be used as the medium, or a mixture of the liquid crystalline material and a dye may be used as the medium.

There is no particular limit in the dye, but dye having absorption band within the wavelength of the exitation light. For example, the dye may be a compound (1-amino-anthraquinone (hereinafter, referred to as "1AAQ"; made by Aldrich) represented by the following formula:

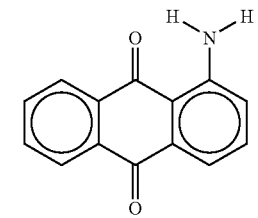

By adding "1AAQ" in a compound ("5CB"(pentylcyanobiphenyl)) represented by Formula (1) so that the content of "1AAQ" in the medium consisted of 5CB and 1AAQ is 0.03 wt %, the medium becomes about 10 times more changeable in the magnitude of the optical anisotropy compared with the medium containing no a "1AAQ".

In order to generate the optical anisotropies in the respective domains in the display element, use of electric field, magnetic field, light or the like, or the like may be adopted, for example. Among them, the use of the electric field is preferable for the sake of easy designing and driving control of the display element.

Therefore, the display element may be provided with, for example, electric field applying means (such as an electrode or the like), magnetic field applying means (such as an electromagnet or the like), or the like as means for applying a field. For the sake of easy designing) and driving control of the display element, the electric field applying means is preferable.

The present invention is not particularly limited in terms of the means for applying the field, provided that the means for applying the field is capable of changing the magnitude of the optical anisotropy of the medium depending on whether or not the field is applied (and by and according to the field applied thereby). Besides the electric field applying means (such as an electrode or the like) and magnetic field applying means (such as an electromagnet or the like), a laser device, light radiating means (excitation light generating means) such as the above-mentioned Nd: YAG laser and the like are applicable as the means for applying the field.

Therefore, the present invention may be arranged such that the present element comprises the means for applying the field, or such that the means for applying the field is provided in addition to the display element. That is, a display device according to the present invention may be so arranged as to comprise the display element including the means for applying the field, or to comprise the display element and the means for applying the field. In other words, the display device may have such an arrangement that it comprises (a) the display element has the arrangement that allows the pixel to have at least two domains in which the medium shows optical anisotropies of different directions when the field is applied or when no field is applied, and (b) means for applying a field on medium in the display element.

Further, the display element according to the present invention may be arranged such that the medium, the magnitude of whose optical anisotropy is changeable, is, for example, a medium in which an orderly structure (orientational order) is changed by application of a field thereby changing the magnitude of the optical anisotropy. For example, the medium may be such that it has an orderly structure equal to or smaller than the wavelength of visible light when the field is applied or when no field is applied, and that the field application changes the orderly structure thereby changing the magnitude of the optical anisotropy. Further, the medium may such that when no field is applied, it has an orderly structure that causes the optical anisotropy and that the field application changes the orderly structure thereby changing the magnitude of the optical anisotropy. In other words, the display element according to the present invention may be a display element that performs display operation by applying a field on a medium between a pair of substrates, at least one of which is transparent, the field changing an orderly structure in the medium so as to change a magnitude of optical anisotropy of the medium.

This arrangement is free from the problem that the inherent viscosity of the liquid crystal largely affects response speed, unlike the conventional liquid crystal display element. Thus, it is possible to realize high-speed response with this arrangement.

Moreover, in this arrangement, temperature control necessary is such temperature control that the medium is kept at such temperatures at which the medium is in such a state under which it has a certain orderly structure (a state under which the orderly structure is distorted by field application, thereby changing the magnitude of the optical anisotropy) when the field is applied or when no field is applied. Such temperature control is quite easy. For example, in the display device (as described in Patent Publication 1) utilizing the electric-field-induced polarization of polar molecules, its driving (operable) temperature range is limited within temperatures in the vicinity of a phase transition point of a liquid phase, thus this display device requires quite highly accurate temperature control. On the contrary, in the arrangement according to the present invention, temperature control necessary here is to keep the medium at the temperatures at which the medium is in such a state under which it has a certain orderly structure. Thus, the temperature control in the present invention is quite easy.

Moreover, the medium for use in the display element of the present invention is not limited to the medium that shows the Kerr effect, that is, whose refractive index is changeable proportionally to the square of the electric field. As long as the magnitude of its optical anisotropy is changeable by the application of a field, any medium may be used as the medium for use in the display element of the present invention.

In the above description, it is stated that "the present display element may be expressed as a display element basically arranged such that (i) the electric field is applied along the normal direction of the surfaces of the substrates (vertical electric field application), (ii) the medium for the dielectric material layer 3 is a negative type liquid crystal (use of negative type liquid crystal), and (iii) the rubbing directions of the alignment films respectively provided on the substrates cross each other perpendicularly (twist rubbing)". However, in addition to the above arrangement, the present display element may contain a polymer network so that the orientation of the molecules is stabilized in advance in order to more efficiently attain the twist orientation of the molecules which the medium comprises, for instance, when the field is applied. The following explains an example in which such polymer network is used.

A dielectric material layer 3 is prepared with a mixture type liquid crystal made of 3HPFF, 5HPFF, and 7HPFF. Here, the mixture type liquid crystal also contains, for instance, (a) UCL001 (by DIC (Dainippon Ink and Chemicals, incorporated), which is a liquid crystalline monomer, (b) diacrylate monomer RM257 (by Merck Ltd.) as a cross linker (cross-linking agent), and (c) DMPAP (2,2-dimethoxy-2-phenylactophenon, made by Aldrich) as a photo initiator. The UCL001 is an equi-amount (equi-weight) mixture of the following materials respectively represented by the following formulae:

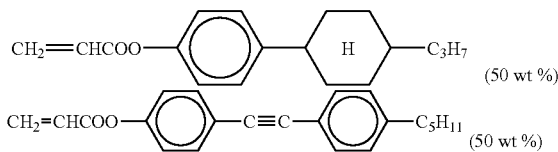

The RM257 is represented by the following formula:

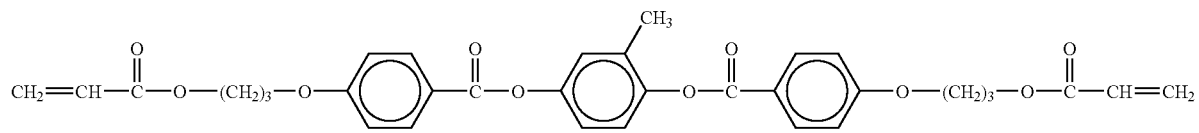

DMPAP is represented by the following formula.

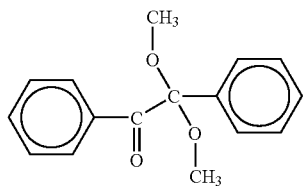

The mixture type liquid crystal contains these materials at the following ratio:

Mixture system of Negative Type Liquid Crystal Material (3HPFF, 5HPFF, 7HPFF; mixing ratio is mentioned above): 95.8 wt %

|  |  |
|---|---|
| UCL001 | 3.0 wt % |
| RM257 | 1.0 wt % |
| DMPAP | 0.2 wt % |

The mixture system thus prepared by mixing the liquid crystal material, monomer, and the like was injected into a cell of a display element according to the present embodiment. $T_{ni}$ (Nematic-Isotropic phase transition temperature) of the mixture system in which the monomer, the photo-initiator were added was substantially equal to that of the liquid crystal, that is, was 113° C. At temperatures below 113° C., the dielectric material layer 3 showed the nematic phase state. Because alignment directions of the alignment films of the respective substrates cross each other perpendicularly in the present embodiment, molecules were oriented in twist orientation in which the molecules were oriented in one twisting direction from one substrate to the other so that a direction of the orientation of the molecules on one substrate makes 90 degrees with that of the molecules on the other substrate.

Ultraviolet rays were radiated on the mixture system in the nematic phase (for example, the dielectric material layer 3 kept at 103° C. (T=$T_{ni}$−10(K)). The radiation of the ultraviolet rays was carried out with a wavelength of 365 nm and at 1.0 mW/cm² for 10 minutes.

After that, the temperature of the display element was increased to a temperature in a temperature range of isotropic phase, which is higher than 113° C. Then, electro-optical property of the display element with the stabilization by the polymer network was measured. As a result, transmittance change was observed up to about 1K from 113° C. in the display element without the stabilization by the polymer network, whereas transmittance change was observed up to about 5K from 113° C. in the display element with the stabilization by the polymer network. This indicated that the polymer network establishes environment in which the twist orientation is easy to occur when the electric field is applied.

The types of the liquid materials, monomers, and the like, a mixing ratio thereof in the mixture system, discussed in the present embodiment are merely examples. The present invention is not limited to the numerical values mentioned above. Because a optimal mixing ratio is different depending on which liquid crystal material is used as the host, and which monomer and the like is added to the host, the mixing ratio may be arbitrarily set depending on the materials to be used, and is not limited to the above ratio. However, it is preferable that the amount of the monomer to add is so set that the resultant polymer network will not affect the visible light when the medium of the dielectric material layer 3 is optically isotropic. For instance, in case of a display element in which, as in the present embodiment, the medium is optically isotropic when no electric field is applied and becomes optically anisotropic (90 degrees twist orientation) when the electric field is applied, thereby switching the display state, the amount of the monomer to add is preferably set such that the resultant polymer network will not affect the visible light. Thus, the amount of the liquid crystalline monomer to add is set in such a manner that the resultant polymer network will not affect the visible light.

Moreover, the display element and the display device according to the present invention have wide-ranged applications: image display devices such as televisions, monitors, and the like; OA (Office Automation) apparatuses such as word processors, personal computers and the like; image display devices for video cameras, digital cameras, information terminals such as portable (mobile) telephones. Moreover, the high-speed response property allows the display element and the display device according to the present invention to be suitable for example in a display device of field sequential color mode.

A display element according to the present invention is, in order to attain the object, provided with a pair of substrates, at least one of which is transparent; a material layer between the substrates; and alignment films respectively on facing surfaces of the substrates, the display element performing display operation by applying a field on the material layer, the material layer containing a medium being changeable in a magnitude of its optical anisotropy by the field, and the alignment films having alignment directions that cross each other perpendicularly.

The field in the above arrangement is not particularly limited, provided that it can change the magnitude of the optical anisotropy of the medium. For example, the field may be an electric field, magnetic field, light, or the like.

Here, when the magnitude of the optical anisotropy is changed, a shape of a refractive index ellipsoid is changed. That is, in the display element according to the present invention, it is possible to change the display state by utilizing the change in the shape of the refractive index ellipsoid depending on whether the field is applied or not.

On the contrary, the display operation in the conventional liquid crystal display element is carried out by applying an electric field on a medium. In the conventional liquid crystal display element, the refractive index ellipsoid is kept ellipsoidal regardless of whether the electric field is applied or not. However, a major axial direction of the refractive index ellipsoid (direction of the refractive index ellipsoid) is changed (rotated) depending on whether the electric field is applied or not. That is, in the conventional liquid crystal display element, the display state is changed by utilizing the change (rotation) of the major axial direction of the refractive index ellipsoid (direction of the refractive index ellipsoid) depending on whether the field is applied or not.

In such a conventional liquid crystal display element in which the change in the orientational direction of the liquid crystal molecules is utilized, inherent viscosity of the liquid crystal largely affects response speed of the conventional liquid crystal display element. On the contrary, in the above arrangement, the display operation is carried out by utilizing the change in the magnitude of the optical anisotropy of the medium. Therefore, unlike the conventional liquid crystal display element, the above arrangement is free from such problem that the inherent viscosity of the liquid crystal largely affects response speed. Therefore, this arrangement attains high-speed (fast) response. Moreover, the high-speed response property allows the display element of the present invention to be used in, for example, a display device of field sequential color mode.

Moreover, according to this arrangement, phase differences caused in the vicinity of the alignment films by the alignment films, or phase differences caused by molecules adsorbed on the alignment films cross each other perpendicularly. Thus, the phase differences cancel out each other. Therefore, the phase differences make no contribution to the transmittance. Because of this, it is possible to attain high contrast.

Moreover, with this arrangement, it is possible to orient the molecules of the medium in one twisting direction when the field is applied or when no field is applied (that is, the molecules are directed in different directions sequentially from one substrate to the other). In this way, the twisted structure is formed. As a result, it becomes possible to suppress the coloring phenomenon caused by wavelength dispersion of the refractive index of the molecules.

Therefore, with this arrangement, it is possible to realize a display element in which transmittance is changed by controlling orientational order of molecules, and in which contrast is improved and coloring phenomenon is alleviated, and a display device provided with the display element.

As the field to change the magnitude of the optical anisotropy of the medium, the electric field is preferable for the sake of easy designing and driving control of the display element.

Moreover, in this arrangement, temperature control necessary is such temperature control that the medium is kept at such temperatures at which the magnitude of the optical anisotropy is changeable by and according to the field application. Such temperature control is quite easy.

Moreover, because the display operation in this arrangement is carried out by utilizing the change of the magnitude of the optical anisotropy of the medium, it is possible to attain a wider viewing angle in this arrangement than in the conventional liquid crystal display element in which the display operation is carried out by changing the orientational order of the liquid crystal molecules.

Moreover, the display element according to the present invention may include polarizers respectively on the substrates, the polarizers having absorption axial directions that cross each other perpendicularly and that are perpendicular to and parallel to the respective alignment directions of the alignment films (that is, one of the polarizers is perpendicular to the alignment direction of one of the alignment films and parallel to the alignment direction of the other of the alignment films, whereas the other one of the polarizers is perpendicular to the alignment direction of the other of the alignment films and parallel to the alignment direction of the one of the alignment films).

With this arrangement it is possible to provide more effective prevention of light leakage, even if the phase differences caused in the vicinity of the alignment films are not identical with each other perfectly. Therefore, it is possible to attain better contrast.

The alignment films may be an organic thin film or may be made of polyimide.

Moreover, in case where the field is an electric field, the medium may contain a rod-like molecule having negative dielectric anisotropy. Here, the rod-like molecule is such a molecule that has a molecular structure that has structural anisotropy, and whose lengths along major axial directions and minor axial directions are different. Further, in case where the field is an electric field, the medium may contain a liquid crystalline compound. It is especially preferable that the liquid crystalline compound contained in the medium be a negative type liquid crystalline compound. The negative type liquid crystalline compound is a compound of liquid crystal molecules that satisfies $\Delta n = ne - no > 0$ and $\Delta \epsilon = \epsilon // - \epsilon \perp < 0$, where ne is a refractive index (extraordinary light refractive index) along a major axial direction of the liquid crystal molecules, $\epsilon //$ is a dielectric constant along the major axial direction of the liquid crystal molecules, no is a refractive index (ordinary light refractive index) along a minor axial direction of the liquid crystal molecules, and $\epsilon \perp$ is a dielectric constant along the minor axial direction of the liquid crystal molecules. The medium containing the liquid crystalline compound is preferable because it shows a liquid crystal phase at low temperatures but the isotropic phase at high temperatures, and allows easy generation of optical anisotropy.

Moreover, the medium may contain a chiral agent or may be a chiral material. Here, the chiral material is such a material that has chirality.

With any of these arrangements, it is possible to cause the molecules of the medium to have or form a twist structure that is twisted rightward or leftward only (dextrorotatory or levorotatory). These arrangements are free from such a problem that the transmittance is low on a boundary between domains in an arrangement where there are multi domains that respectively have twist structures twisted rightward and twisted leftward. Therefore, it is possible to attain better contrast.

In case where the field is an electric field, the medium may be such that a refractive index of the medium is changeable proportionally to square of an electric field. Further, the medium may contain a polar molecule.

With these arrangements, it is possible to realize a display element having high-speed response property.

Moreover, the medium may be such a medium that is optically isotropic when no field is applied, and becomes optically anisotropic when the field is applied. In this arrangement, the shape of the refractive index ellipsoid is spherical when no field is applied, and becomes ellipsoidal when the field is applied. Moreover, the medium may be such a medium that is optically anisotropic when no field is applied, and becomes optically isotropic when the field is applied. In this arrangement, the shape of the refractive index ellipsoid is ellipsoidal when no field is applied, and becomes spherical when the field is applied. Moreover, the medium may be such a medium that is optically anisotropic when no field is applied, but the magnitude of the optical anisotropy is changed by and according to the field application. In this arrangement, the shape of the refractive index ellipsoid is changed in a ratio between its major axial length and minor axial length depending on whether the field is applied or not (the shape of the refractive index ellipsoid may be substantially spherical).

With this arrangement, the field application causes distortion of the orderly structure of the molecules which the medium comprise, thereby changing the optical anisotropy of the medium. Therefore, it is possible to change the display state depending on whether the field is applied or not.

In the above arrangement, the display operation is carried out by utilizing the change in the optical anisotropy of the molecules which the medium comprises. Therefore, the inherent viscosity of the liquid crystal does not affect the response speed largely. Thus, the above arrangement can realize fast response. Moreover, the distortion of the orderly structure of the molecules caused by the field application is not largely affected by temperatures. Thus, with this arrangement, it is easy to perform the temperature control. Moreover, in the above arrangement, the display operation is carried out by utilizing the change in the magnitude of the optical anisotropy of the molecules of the medium. Thus, this arrangement attains a wider viewing angle property than in the arrangement in which the display operation is carried out by changing only the orientational directions of the liquid crystal molecules.

It is preferable that, in the scale smaller than the wavelength of visible light, the medium is not in an isotropic phase like liquid, but has an order (orderly structure, orientational order) microscopically. When the orderly structure is smaller than the wavelength of visible light, the medium is optically isotropic. Therefore, the use of the medium which has an orderly structure smaller than the wavelength of visible light when the field is applied or when no field is applied makes it possible to surely change the display state between when the field is applied and when no field is applied (that is, depending on whether or not the field is applied or not).

The display device according to the present invention is provided with any one of the above-described display elements according to the present invention, in order to attain the aforementioned object.

The display device thus arranged is provided with the display element in which transmittance is changed by controlling orientational order of molecules, and in which contrast is improved and coloring phenomenon is alleviated, and a display device provided with the display element. This display device is advantageous in that contrast is improved and the coloring phenomenon is alleviated.

The high-speed response property of the display element according to the present invention allows the display element to be used in a display device of field sequential color mode.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display element, comprising:
a pair of substrates, at least one of which is transparent;
a material layer between the substrates; and
alignment films respectively provided on facing surfaces of the substrates,
the display element performing display operation by applying a field on the material layer,
the material layer comprising a medium being changeable in a magnitude of its optical anisotropy by the field, and
the alignment films having alignment directions that cross each other perpendicularly.

2. A display element as set forth in claim 1, wherein:
the medium being changeable in a magnitude of its optical anisotropy by an electric field.

3. A display element as set forth in claim 2, wherein:
the medium contains a rod-like molecule having negative dielectric anisotropy.

4. A display element as set forth in claim 2, wherein:
the medium contains a negative type liquid crystalline compound.

5. A display element as set forth in claim 2, wherein:
a refractive index of the medium is changeable proportionally to square of an electric field.

6. A display element as set forth in claim 2, wherein:
the medium contains a polar molecule.

7. A display element as set forth in claim 1, comprising:
polarizers respectively provided on the substrates, the polarizers having absorption axial directions that cross each other perpendicularly and that are either perpendicular to or parallel to the respective alignment directions of the alignment films.

8. A display element as set forth in claim 1, wherein:
the alignment film is an organic thin film.

9. A display element a set forth in claim 8, wherein:
the alignment films are made of polyimide.

10. A display element as set forth in claim 1, wherein:
the medium contains a chiral agent.

11. A display element as set forth in claim 1, wherein:
the medium is a chiral material.

12. A display element as set forth in claim 1, wherein:
the medium is optically isotropic when no field is applied, and becomes optically anisotropic when the field is applied.

13. A display element as set forth in claim 1, wherein:
the medium is optically anisotropic when no field is applied, and becomes optically isotropic when the field is applied.

14. A display element as set forth in claim 1, wherein:
the molecules of the medium form an orderly structure when field is applied or when no field is applied, the orderly structure being smaller than a visible light wavelength and changeable by and according to application of the field.

15. A display device, comprising:
a display element comprising:
a pair of substrates, at least one of which is transparent;
a material layer between the substrates; and
alignment films respectively provided on facing surfaces of the substrates,
the display element performing display operation by applying a field on the material layer,
the material layer comprising a medium being changeable in a magnitude of its optical anisotropy by the field, and
the alignment films having alignment directions that cross each other perpendicularly.

* * * * *